(12) United States Patent
Mueller et al.

(10) Patent No.: US 7,008,243 B2
(45) Date of Patent: Mar. 7, 2006

(54) TERMINAL BLOCK

(75) Inventors: Manfred Mueller, Berlin (DE); Harald Buelow, Berlin (DE)

(73) Assignee: Krone GmbH, (DE)

( * ) Notice: Subject to any disclaimer, the term of this patent is extended or adjusted under 35 U.S.C. 154(b) by 0 days.

(21) Appl. No.: 10/492,395

(22) PCT Filed: Sep. 13, 2002

(86) PCT No.: PCT/EP02/10284

§ 371 (c)(1),
(2), (4) Date: Apr. 8, 2004

(87) PCT Pub. No.: WO03/034751

PCT Pub. Date: Apr. 24, 2003

(65) Prior Publication Data

US 2004/0259396 A1    Dec. 23, 2004

(30) Foreign Application Priority Data

Oct. 10, 2001 (DE) .............................. 101 50 045

(51) Int. Cl.
*H01R 13/648* (2006.01)
(52) U.S. Cl. ........................... 439/95; 439/939
(58) Field of Classification Search ................. 439/95, 439/939
See application file for complete search history.

(56) References Cited

U.S. PATENT DOCUMENTS

| | | | | |
|---|---|---|---|---|
| 3,366,918 A | * | 1/1968 | Johnson et al. | 439/939 |
| 4,386,814 A | * | 6/1983 | Asick | 439/939 |
| 4,574,325 A | * | 3/1986 | Holton | 361/218 |
| 4,993,959 A | * | 2/1991 | Randolph | 439/92 |
| 5,311,408 A | * | 5/1994 | Ferchau et al. | 361/818 |
| 5,496,185 A | * | 3/1996 | Beak | 439/95 |
| 5,709,569 A | * | 1/1998 | Buck et al. | 439/939 |
| 6,206,731 B1 | * | 3/2001 | Kuo | 439/939 |
| 6,746,254 B1 | * | 6/2004 | Hooper | 439/95 |

FOREIGN PATENT DOCUMENTS

| | | |
|---|---|---|
| DE | 37 28 368 C1 | 11/1988 |
| DE | 44 28 198 C1 | 5/1996 |
| DE | 196 52 422 C1 | 4/1998 |
| DE | 198 44 095 C1 | 3/2000 |
| DE | 199 17 824 A1 | 10/2000 |
| DE | 100 01 553 A1 | 8/2001 |
| EP | 1 005 235 A2 | 5/2000 |
| EP | 1 047 164 A1 | 10/2000 |

OTHER PUBLICATIONS

International Search Report (6 pages).
Derwent English Abstract for EP 1 005 235 A2.

(Continued)

*Primary Examiner*—Tho D. Ta
(74) *Attorney, Agent, or Firm*—Merchant & Gould P.C.

(57) ABSTRACT

The invention relates to a terminal block for data and telecommunications systems, comprising at least one insulating body. At least one connecting element (8), designed to house a grounding clip (9), is configured on the underside of said body. According to the invention, the grounding clip (9) has a first detent geometry for connecting to the connecting element (8) and a second detent geometry for connecting to a mounting frame. The connecting element (8) has a geometry that is independent of the mounting frame, the first detent geometry of the grounding clip (9) is adapted to the geometry of the connecting element (8) and the second detent geometry is adapted to the mounting frame.

34 Claims, 4 Drawing Sheets

OTHER PUBLICATIONS

Derwent English Abstract for DE 37 28 368 C1.
Derwent English Abstract for DE 44 28 198 C1.
Derwent English Abstract for EP 1 047 164 A1.
Derwent English Abstract for DE 100 01 553 A1.

* cited by examiner

TERMINAL BLOCK

FIELD OF THE INVENTION

The invention relates to a terminal block for telecommunications and data systems equipment according to the preamble of patent claim 1.

BACKGROUND OF THE INVENTION

A terminal block of this type is already known for example from DE 37 28 368 C1. For latching the terminal block onto round profiled bars, the terminal block has on the underside of its insulating part arcuate connecting elements which enclose the profiled bars by an angle of over 180°. The inside diameter of the arcuate connecting elements corresponds to the outside diameter of the round profiled bars. On account of the terminal blocks, and in particular the lower part, being formed from plastic, the side walls of the connecting elements are flexible, so that they can be pressed over the round profiled bar and latched onto it. The arcuate connecting elements bear on the outer side rectangular wire-guiding saddles, which are slotted in the center. Extending through the arcuate connecting elements, parallel to the outer walls of the upper part, are through-slots, into which there can be inserted metallic ground-contact saddles, which are clamped onto the round profiled bars at ground potential and onto which contact terminals of a surge arrester mounting unit, which can be inserted into the terminal block, can be clamped from above. The ground-contact saddles have in the lower region three arcuate saddles, the inner contour of which is made to match the round profiled bar. Formed onto one saddle of the ground-contact saddle is a contacting prong, which engages in an upwardly open chamber of the terminal block. The lower part of the terminal block also has on the outer side of the arcuate connecting elements insertion slots which are used for prizing the terminal block out of the position in which it is latched with a round profiled bar using a screwdriver.

A terminal block with two terminal strips angled away from one another and a shielding device is known from DE 100 01 553 A1. Each terminal strip comprises 24 insulation-displacement contact elements, the respectively opposing insulation-displacement contact elements of the two terminal strips being electrically connected to one another. The insulation-displacement contact elements are arranged in an insulator, on the underside of which half-shell-shaped fastening elements are arranged, by means of which the terminal block can be pushed or latched onto a profiled bar. Groups of three neighboring insulation-displacement contact elements serve for the wiring of a twin conductor with shielding. The upper terminal strip in this case forms the switching side, and the terminal strip aligned vertically in relation to said upper terminal strip forms the cable-conductor side. The shielding device comprises a shielding plate, a web arranged perpendicularly in relation to the shielding plate and a row of contact fingers. On the shielding plate, T-shaped webs are provided on its underside and further T-shaped [lacuna] are provided centrally. Furthermore, the shielding plate has two screw-contact elements. The web projects perpendicularly from the upper side of the shielding plate, the row of contact fingers again being formed perpendicularly in relation to the web. As a result, the contact fingers form a plane parallel to the shielding plate. The shielding plate, the web and the row of contact fingers are in this case preferably formed in one piece. For connecting a cable with eight twin conductors and shielding, the cable is initially fastened to the T-shaped webs by means of cable ties. The shielding is twisted and is mechanically and electrically connected to the shielding plate by means of one of the screw-contact elements. Then, in the mounted state, the shielding plate is electrically connected to the profiled bars by means of a connection not described in any more detail and is grounded by means of said profiled bars. The insulation-displacement contact elements assigned to the shielding are connected by means of the contact fingers to the shielding plate and consequently to ground.

A terminal block for latching onto a mounting bracket is known from DE 196 52 422 C1, a connecting element corresponding to the mounting bracket being arranged on the underside. The connecting element in each case comprises two essentially parallel side walls, on which latching projections are arranged, so that, during latching onto the mounting bracket, said latching projections press against said mounting bracket and latch the terminal block. A ground connection between the terminal block and the mounting bracket via this connecting element is not envisaged.

On account of the increasing requirements with regard to transmission speed, terminal blocks with shielding contacting, as described for example in DE 100 01 553 A1, are being used increasingly. On the other hand, the terminal blocks are to be as flexible as possible in their use for the different types of mounting locations, such as for example round profiled bars or mounting brackets, so that a ground connection to mounting brackets is also made possible.

SUMMARY OF THE INVENTION

The invention is therefore based on the technical problem of providing a terminal block by means of which a ground connection to various mounting locations can be flexibly realized.

The solution to the technical problem is provided by the subject matter with the features of patent claim 1. Further advantageous configurations of the invention emerge from the subclaims.

For this purpose, the connecting element has a geometry independent of the mounting rack, the first latching geometry of the grounding clip being adapted to the geometry of the connecting element and the second latching geometry being adapted to the mounting rack. This achieves the effect that the same terminal block can be used for fastening on different mounting racks, the adaptation being performed just by the use of different grounding clips, the first latching geometry of which, for the connection to the connecting element, is the same. By simply exchanging the grounding clips, a terminal block previously latched onto a round profiled bar can be mounted onto a mounting bracket, and vice versa. A possibly desired ground connection of a surge arrester mounting unit remains completely unchanged in this case, since this takes place by means of the first latching geometry of the grounding clip, which always remains the same.

In a preferred embodiment, the connecting element is formed by essentially parallel side walls, on the longitudinal edges of which guiding edges are arranged, along which the grounding clip can be pushed with its first latching geometry onto the connecting element. In a corresponding way, the grounding clip comprises four essentially parallel guiding edges, which correspond to the guiding edges of the connecting element, latching lugs which snap into corresponding latching openings on the guiding edges of the connecting element being arranged on the guiding edges of the grounding clip. The advantage is the very simple geometry, which makes a very firm connection possible between the connecting element and the grounding clip.

In a further preferred embodiment, the grounding clip is formed with a fork contact, via which a simple electrical connection to a shielding plate can be established. The fork contact is preferably arranged between two guiding edges.

The grounding clip for fastening on a mounting bracket has on its second latching geometry at least one latching slot, into which a spring bracket partially protrudes. During latching on, the edge of the mounting bracket then presses the spring bracket to the side. The spring bracket then engages in an opening in the mounting bracket and establishes a good mechanical connection with the mounting bracket.

In a further preferred embodiment, an unlocking eyelet is arranged on the spring bracket, by means of which the spring bracket can be bent away out of the latching slot, so that the latched-on terminal block can be removed again from the mounting trough.

The unlocking eyelet is preferably formed as a clearance cut out from the spring bracket.

In a further preferred embodiment, the unlocking eyelet is arranged virtually at right angles in relation to the spring bracket.

In a further preferred embodiment, the unlocking eyelet is aligned in relation to the respectively neighboring end side of the terminal block, so that it is easily accessible from the outside by means of an implement.

In a further preferred embodiment, the grounding clip comprises two side walls, which are respectively formed with a latching slot, the two side walls being connected to one another by a web and there being formed on the web a U-shaped saddle, which is bent between the side walls and the two legs of which protrude as a spring bracket into the initial region of the latching slots. The use of two latching slots improves the mechanical strength of the connection, the fastening operation being synchronized on account of the connection of the two legs.

For fastening on a round profiled bar, the second latching geometry of the grounding clip is formed essentially in a semicircular manner. In this case, three bearing points are arranged on the inner sides of the semicircular latching geometry, directed toward the profiled bar, so that a mechanical and electrically secure connection with the round profiled bar is obtained.

The two described embodiments of the grounding clips may also be merged into a single grounding clip, so that universal mounting can be realized on the various mounting racks with a single grounding clip.

BRIEF DESCRIPTION OF THE DRAWINGS

The invention is explained in more detail below on the basis of a preferred exemplary embodiment. In the figures.

DETAILED DESCRIPTION OF THE INVENTION

Figure 1:
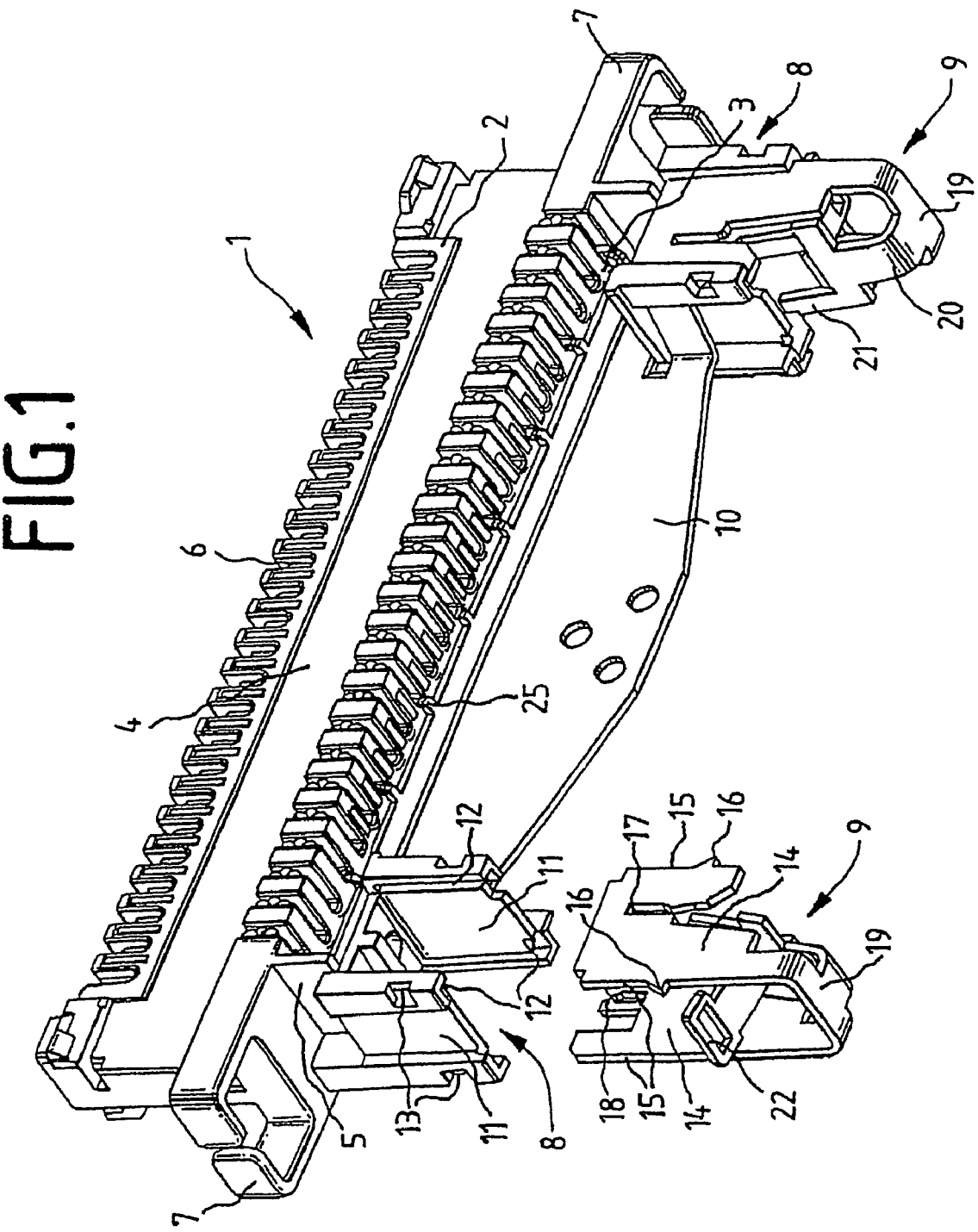
FIG. 1 shows a perspective front view of a terminal block with a grounding clip for a mounting bracket.

In FIG. 1, a terminal block 1 is represented in a perspective front view. The terminal block 1 comprises two terminal strips 2, 3, which are arranged at an angle of 90° in relation to one another. The insulator of the terminal block 1 is divided into two and has an upper part 4 and a lower part 5, which after fitting with insulation-displacement contact elements 6 are latched to one another. On the lower part 5, wire-guiding saddles 7 are respectively arranged on the end sides of the terminal block 1. Arranged on the underside of the lower part 5 are two connecting elements 8. The connecting elements 8 serve for receiving a grounding clip 9 each, and for fastening a shielding plate 10. The connecting element 8 comprises two parallel side walls 11, on the longitudinal sides of which guiding edges 12 are respectively arranged. The side walls 11 or the guiding edges 12 are formed with latching openings 13.

Figure 2:
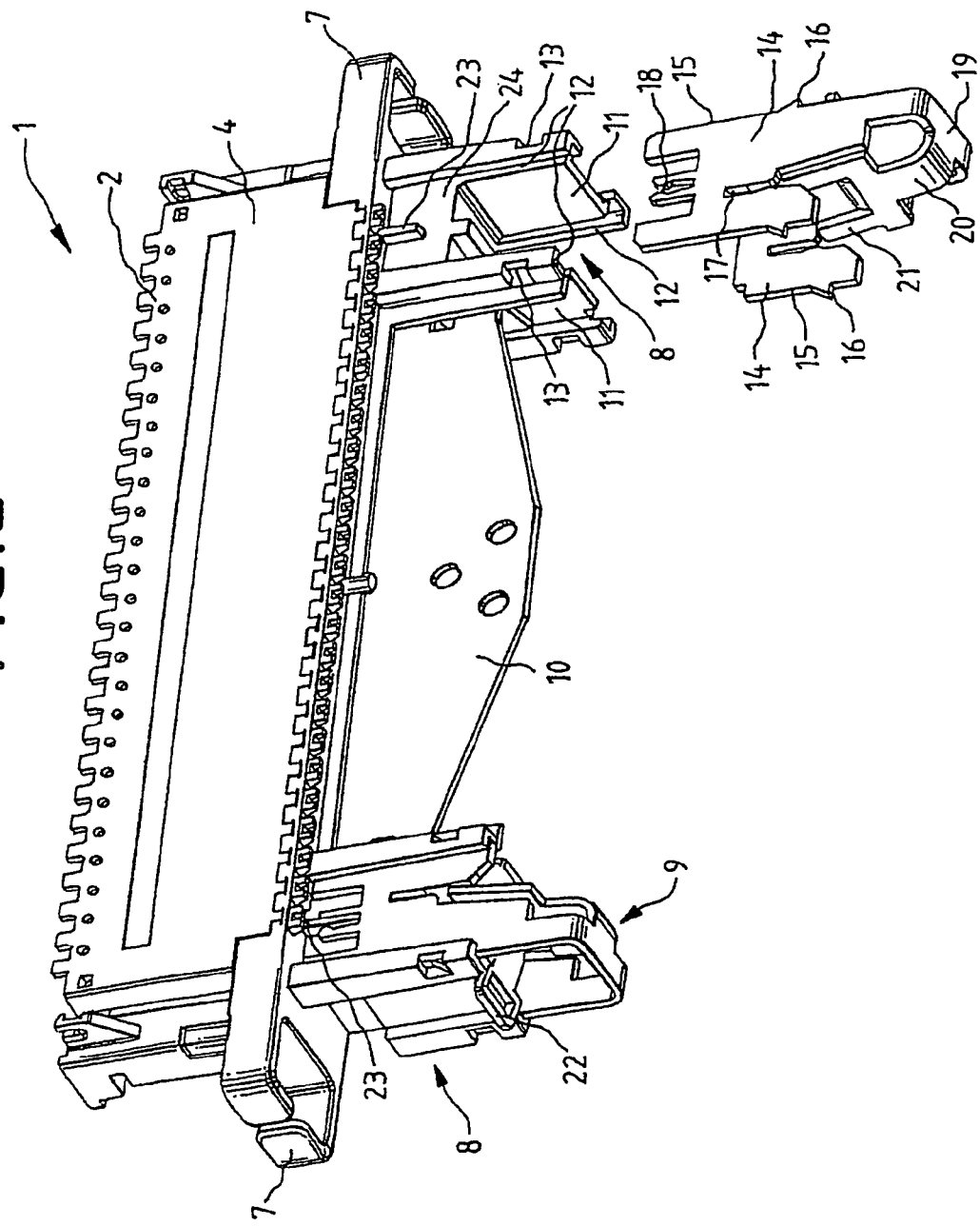
FIG. 2 shows a perspective rear view of the terminal block according to FIG. 1.

The grounding clip 9 has essentially a U shape and is formed in one piece. The longitudinal sides of the two side walls 14 form guiding edges 15, on which a latching lug 16 is respectively arranged. The two side walls 14 are respectively formed with a latching slot 17. Also arranged centrally on the one side wall 14 is a fork contact 18. Arranged on the web 19 connecting the side walls 14 is a saddle 20, which is bent between the side walls and is formed in a U-shaped manner in the upper region. The two legs 21 of the U-shaped saddle 20 in this case protrude slightly obliquely into the initial region of the latching slot 17 and act like two spring brackets. Lying between the two legs 21 is an unlocking eyelet 22, which is cut out from the two legs 21 and is bent at right angles in relation to the legs 21 toward the end side of the terminal block 1. For fastening, the grounding clip 9 is pushed with its guiding edges 15 along the guiding edges 12 of the connecting element 8, until the latching lugs 16 of the grounding clip 9 engage in the latching openings 13 of the connecting element 8. As this happens, the fork contact 18 contacts a contact web 23 of the shielding plate 10, which is represented in FIG. 2. The guiding edges 15 of the side wall 14 with the fork contact 18 are formed such that they are slightly longer than the opposite guiding edges 15, so that, after latching on, the front regions rest on a bearing surface 24 of the connecting element 8 and lend the connection greater stability.

The shielding plate 10 is formed with contact fingers 25, which are connected to every third insulation-displacement contact element 6 of the terminal strip 3, which is represented in FIG. 1.

On account of the electrical connection of the respectively opposing insulation-displacement contact elements 6 of the two terminal strips 2, 3, consequently every third insulation-displacement contact element 6 of the terminal strip 2 is also connected to the shielding plate 10.

If the terminal block 1 with the latched grounding clip 9 is then latched onto a mounting bracket (not represented), the edge of the mounting bracket presses the legs 21 aside and can penetrate into the latching slot 17, the legs 21 engaging resiliently in openings in the edge of the mounting bracket. This brings about a mechanical connection between the mounting bracket and the grounding clips 9. Then, the shielding plate 10 is connected to the ground potential of the mounting bracket via the grounding clips 9. For releasing the latched-on terminal block 1, the unlocking eyelet 22 is pressed downward with an implement, so that the legs 21 are pressed to the side and the terminal block 1 can be pulled down.

Figure 3:
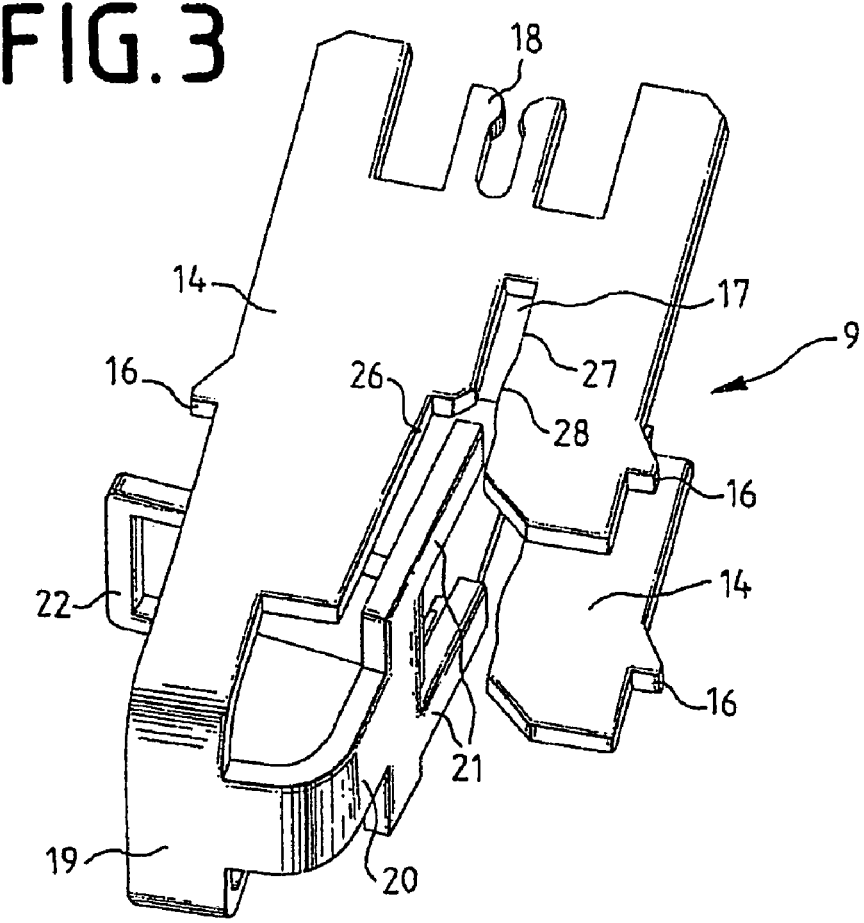
FIG. 3 shows a perspective side view of the grounding clip for a mounting bracket.
Figure 4:
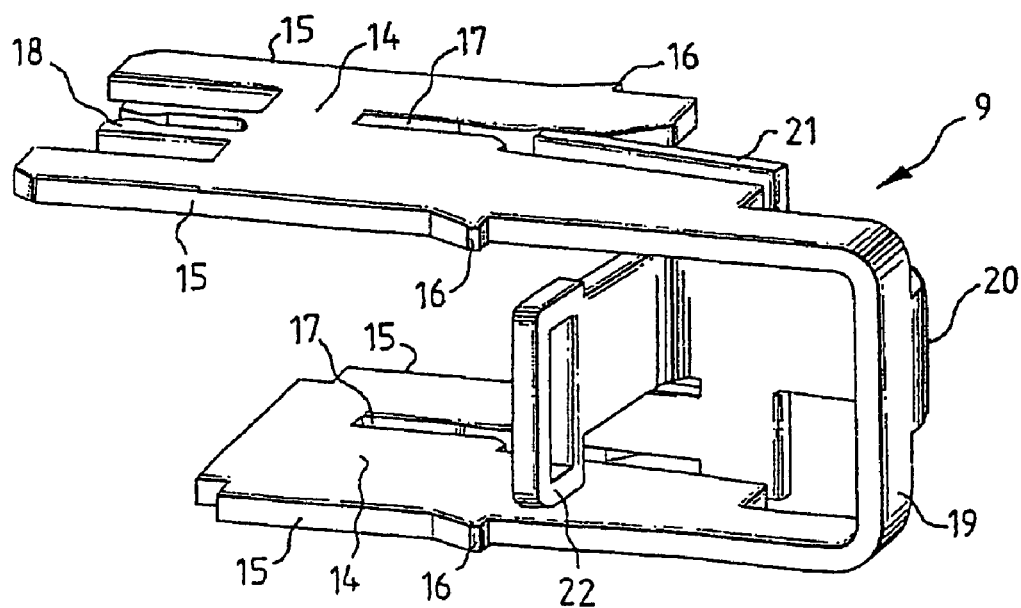
FIG. 4 shows a perspective front view of the grounding clip according to FIG. 3

In FIGS. 3 and 4, the grounding clip 9 is represented on its own. As can be seen, the respective leg 21 lies in front of the latching slot 17 and is pressed by the edge of a mounting bracket in the direction of the edge 26. The edge 26 acts in this case at the same time as a stop edge for the legs 21. The edge 26 is in this case set back slightly with respect to the latching slot 17, so that, when the leg 21 is bearing against the edge 26, the latching slot 17 is completely exposed. This happens for example when the unlocking eyelet 22 is pressed downward. For easier insertion, the one inner edge 27 of the latching slot 17 has in the front region a bevel and a slight curvature 28, the curvature 28 establishing the electrical contact with the mounting bracket.

Figure 5:
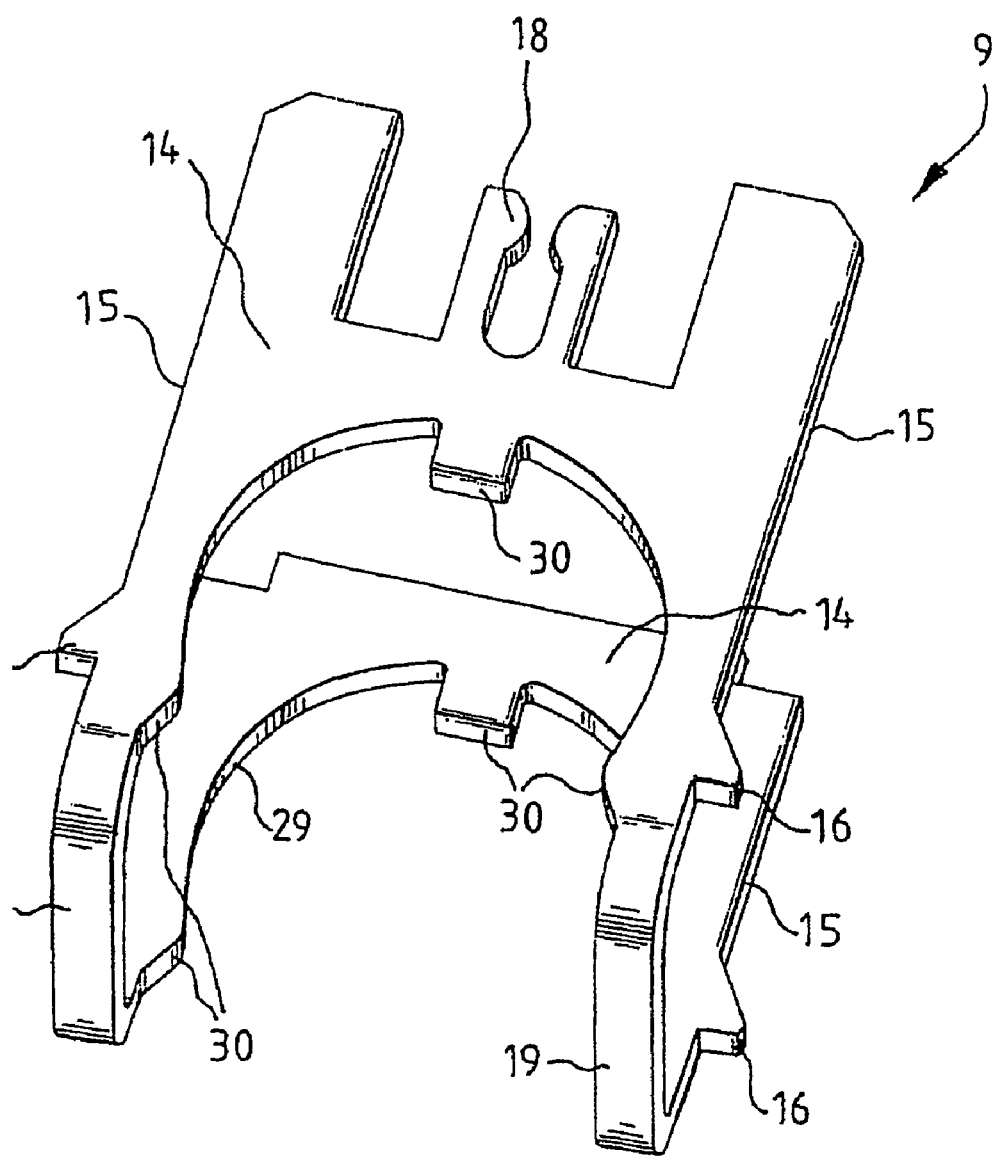
FIG. 5 shows a perspective side view of a grounding clip for round profiled bars.

In FIG. 5, a further grounding clip 9 for latching onto a round profiled bar is represented, the same elements being provided with the same designations as the grounding clip according to FIGS. 3 and 4. With regard to the formation of the connecting element of the terminal block, reference can be made to the comments on FIGS. 1 and 2 in their entirety. The grounding clip 9 again comprises two side walls 14, which are connected to one another by two webs 19. The longitudinal sides of the two side walls 14 form guiding edges 15 and are formed with latching lugs 16.

The two side walls 14 have in the front region respectively semicircular cutouts, the diameter of which is adapted to the diameter of the round profiled bar. The upper side wall 14 is slightly longer and has in the rear region a rectangular cutout, into which the fork contact 18 protrudes. Three bearing points 30 are arranged in each case on the inner side 29 of the semicircular cutouts of each side wall 14. In this case, the three bearing points 30 are respectively offset by about 90° in relation to one another. In this case, the two centrally arranged bearing points 30 are of a cuboidal form and the other bearing points 30 are of a curved form. This results in a good mechanical and electrical three-point bearing.

LIST OF DESIGNATIONS

1) Terminal block
2) Terminal strip
3) Terminal strip
4) Upper part
5) Lower part
6) Insulation-displacement contact elements
7) Wire-guiding saddles
8) Connecting element
9) Grounding clip
10) Shielding plate
11) Side wall
12) Guiding edge
13) Latching opening
14) Side wall
15) Guiding edge
16) Latching lug
17) Latching slot
18) Fork contact
19) Web
20) Saddle
21) Leg
22) Unlocking eyelet
23) Contact web
24) Bearing surface
25) Contact finger
26) Edge
27) Inner edge
28) Curvature
29) Inner side
30) Bearing points

What is claimed is:

1. A terminal block for telecommunications and data systems equipment, comprising:
    at least one insulator;
    a connecting element disposed proximate an underside of said insulator;
    a grounding clip, said grounding clip including a first geometry for connecting to said connecting element and a second geometry for connecting to a mounting rack; and
    wherein said connecting element has a geometry independent of the mounting rack, said first geometry adapting to said connecting element and said second geometry adapting to the mounting rack, the connecting element including two generally parallel side walls, the sidewalls of the connecting element defining guiding grooves for receiving the ground clip, the sidewalls of the connecting element defining latching slots within the guiding grooves, the ground clip including two generally parallel side walls defining guiding edges and a latching lug disposed on each of the guiding edges, the guiding edges configured to slide within the guiding grooves of the connecting element and the latching lugs configured to latch into the latching slots of the connecting element.

2. The terminal block as recited in claim 1, wherein said grounding clip includes a fork contact.

3. The terminal block as recited in claim 2, wherein said fork contact is disposed between the guiding edges.

4. The terminal block as recited in claim 1, wherein said second geometry of said grounding clip includes at least one latching slot into which a spring bracket at least partially protrudes.

5. The terminal block as recited in claim 4, wherein said spring bracket includes an unlocking eyelet.

6. The terminal block as recited in claim 5, wherein said unlocking eyelet is forming a clearance cut out from said spring bracket.

7. The terminal block as recited in claim 5, wherein said unlocking eyelet is disposed at a generally right angle to said spring bracket.

8. The terminal block as recited in claim 1, wherein said grounding clip includes two side walls arranged on a web, each of said sidewalls of the grounding clip includes a latching slot.

9. The terminal block as recited in claim 8, wherein said grounding clip includes a U-shaped saddle disposed between said sidewalls including at least two legs protruding as spring brackets into an initial region of said latching slot.

10. The terminal block as recited in claim 1, wherein said second geometry of said grounding clip is generally semicircular.

11. The terminal block as recited in claim 10, wherein said second geometry includes at least one bearing point disposed on an inner side in a general direction of a profiled bar.

12. A grounding clip for use in a terminal block for telecommunications and data systems equipment, comprising:
    a first geometry for connecting to a connecting element and a second geometry for connecting to a mounting rack; and
    wherein said grounding clip has a geometry independent of the mounting rack, said first geometry adapting to said connecting element and said second geometry adapting to said mounting rack, wherein said second geometry includes at least one latching slot into which a spring bracket at least partially protrudes.

13. The grounding clip as recited in claim 12, wherein the grounding clip includes a fork contact.

14. The grounding clip as recited in claim 13, wherein said fork contact is disposed between two guiding edges.

15. The grounding clip as recited in claim 12, wherein said spring bracket includes an unlocking eyelet.

16. The grounding clip as recited in claim 15, wherein said unlocking eyelet forms a clearance cut out from said spring bracket.

17. The grounding clip as recited in claim 15, wherein said unlocking eyelet is disposed at a generally right angle to said spring bracket.

18. The grounding clip as recited in claim 12, wherein the grounding clip includes two side walls arranged on a web, each of said side walls having a latching slot.

19. The grounding clip as recited in claim 18, wherein the grounding clip includes a U-shaped saddle disposed between said sidewalls including at least two legs protruding as spring brackets into an initial region of said latching slot.

20. A terminal block for telecommunications and data systems equipment, comprising:
at least one insulator;
a connecting element disposed proximate an underside of said insulator;
a grounding clip, said grounding clip including a first geometry for connecting to said connecting element and a second geometry for connecting to a mounting rack; and
wherein said connecting element has a geometry independent of the mounting rack, said first geometry adapting to said connecting element and said second geometry adapting to the mounting rack, wherein said second geometry of said grounding clip includes at least one latching slot into which a spring bracket at least partially protrudes.

21. The terminal block as recited in claim 20, wherein said spring bracket includes an unlocking eyelet.

22. The terminal block as recited in claim 21, wherein said unlocking eyelet is forming a clearance cut out from said spring bracket.

23. The terminal block as recited in claim 21, wherein said unlocking eyelet is disposed at a generally right angle to said spring bracket.

24. A terminal block for telecommunications and data systems equipment, comprising:
at least one insulator;
a connecting element disposed proximate an underside of said insulator;
a grounding clip, said grounding clip including a first geometry for connecting to said connecting element and a second geometry for connecting to a mounting rack; and
wherein said connecting element has a geometry independent of the mounting rack, said first geometry adapting to said connecting element and said second geometry adapting to the mounting rack, wherein said grounding clip includes two side walls arranged on a web, each of said sidewalls includes a latching slot.

25. The terminal block as recited in claim 24, wherein said grounding clip includes a U-shaped saddle disposed between said sidewalls including at least two legs protruding as spring brackets into an initial region of said latching slot.

26. A grounding clip for use in a terminal block for telecommunications and data systems equipment, comprising:
a first geometry for connecting to a connecting element and a second geometry for connecting to a mounting rack; and
wherein said grounding clip has a geometry independent of the mounting rack, said first geometry adapting to said connecting element and said second geometry adapting to said mounting rack, wherein the grounding clip includes two side walls arranged on a web, each of said side walls having a latching slot.

27. The grounding clip as recited in claim 26, wherein the grounding clip includes a U-shaped saddle disposed between said sidewalls including at least two legs protruding as spring brackets into an initial region of said latching slot.

28. A terminal block for telecommunications and data systems equipment, comprising:
at least one insulator;
a grounding clip coupled to the insulator, the grounding clip including a generally U-shaped body including two legs connected together by a web, the two legs defining generally parallel sidewalls, each sidewall defining a cutout configured to receive a conductive mounting element and each sidewall defining guiding edges; and
a connecting element disposed between said insulator and said grounding clip, the connecting element including two generally parallel side walls, the sidewalls of the connecting element defining guiding grooves for receiving the guiding edges of the grounding clip.

29. A terminal block according to claim 28, wherein the sidewalls of the connecting element define latching slots within the guiding grooves and the grounding clip includes a latching lug disposed on each of the guiding edges, the latching lugs configured to latch into the latching slots of the connecting element.

30. A terminal block according to claim 28, wherein the cutout of the grounding clip includes a slot configured to receive a mounting bracket.

31. A terminal block according to claim 28, wherein the cutout of the grounding clip is generally semicircular configured to receive a round profiled bar.

32. A terminal block according to claim 28, wherein the grounding clip includes a fork contact disposed between the guiding edges.

33. A terminal block according to claim 28, wherein the grounding clip includes a U-shaped saddle disposed between the sidewalls of the grounding clip including at least two legs protruding as spring brackets into the cutout.

34. A terminal block according to claim 33, wherein said spring bracket includes an unlocking eyelet for unlocking the conductive mounting element from the grounding clip.

* * * * *